United States Patent [19]

Erni et al.

[11] Patent Number: 4,790,980
[45] Date of Patent: Dec. 13, 1988

[54] DEVICE FOR THE GENERATION OF OZONE AND A PROCESS FOR ITS OPERATION

[75] Inventors: Peter Erni, Baden; Gerard Kirsch, Zürich, both of Switzerland

[73] Assignee: BBC Brown, Boveri & Company, Limited, Baden, Switzerland

[21] Appl. No.: 873,710

[22] Filed: Jun. 12, 1986

[30] Foreign Application Priority Data

Jun. 21, 1985 [CH] Switzerland ............... 2643/85

[51] Int. Cl.$^4$ ................. B01J 19/08; C01B 13/10
[52] U.S. Cl. ............... 422/186.15; 422/186.07; 204/176; 315/57; 315/102; 315/276; 315/DIG. 5
[58] Field of Search ........... 422/186.15, 186.07; 204/176; 315/102, 103, 57, 276, DIG. 2, DIG. 5, DIG. 7, 224, 307

[56] References Cited

U.S. PATENT DOCUMENTS

| | | | |
|---|---|---|---|
| 2,857,323 | 10/1958 | Cromwell | 422/186.15 X |
| 3,800,210 | 3/1974 | Caussin | 422/186.15 X |
| 4,128,768 | 12/1978 | Yamamoto et al. | 422/186.18 X |
| 4,348,615 | 9/1982 | Garrison et al. | 315/DIG. 7 X |
| 4,415,837 | 11/1983 | Sodini | 315/276 X |
| 4,458,181 | 7/1984 | Johnson | 315/276 X |

FOREIGN PATENT DOCUMENTS 0107894 8/1979 Japan ................ 422/186.15

Primary Examiner—John F. Terapane
Assistant Examiner—Susan Wolffe
Attorney, Agent, or Firm—Oblon, Fisher, Spivak, McClelland & Maier

[57] ABSTRACT

A device and process for the generation of ozone using an ozone generator having two electrodes connected across the secondary winding of a high voltage transformer, the primary winding of which is connected to a converter which supplies thereto a square wave current of variable amplitude and variable frequency. A compensation coil is connected across either the primary winding or the secondary winding of the transformer. The ozone generator includes a solid dielectric and a gas path between its two electrodes. The inductance of the compensating choke and the operating frequency of the converter are selected such that the resonance frequency of the resonant circuit formed by the ozone generator and the compensation choke lies below the operating frequency of the converter current supply in any operating condition. In this way the degree of utilization of medium voltage converters of converter-fed ozone generators is significantly increased by connecting a compensation choke (6) in parallel to the ozone generator (5) and by dimensioning it suitably.

19 Claims, 3 Drawing Sheets

DEVICE FOR THE GENERATION OF OZONE AND A PROCESS FOR ITS OPERATION

BACKGROUND OF THE INVENTION

Field of the Invention

This invention relates to a device for the generation of ozone and to a process for its operation.

Discussion of Background

A conventional ozone generation device representative of the state of the art is known from German Offenlegungsschrift No. 2,111,041.

There are two main possibilities of electrical supply for high-performance industrial ozone generators:
 supply with mains frequency (50 or 60 Hz)
 supply with medium frequency (200–2000 Hz)

Supply with mains frequency, which can only be used for ozone generators with small power densities q (power per active area), is very simple and consists, in principle, of only a regulating transformer and a high-voltage transformer. The power consumption of the ozone generator can be varied by regulating the voltage.

In ozone generators which are supplied with medium frequency, the mains voltage is converted to direct current by means of a controlled rectifier and is subsequently converted to medium frequency square-wave current with the aid of an inverter. This current, with associated voltage, is then transformed to the values necessary for operation of the ozone generator with the aid of a high-voltage transformer. A direct current choke between the rectifier and the inverter serves as an energy store and as an isolation between the low-frequency part and the medium-frequency part. In DE-B1 No. 2,525,059 (claim 1), specific attention was drawn to the fact that the direct current choke must have very high inductance so that square-wave current is always available to the ozone generator, since this improves the ozone yield. The power consumption of the ozone generator can be adjusted by varying the direct current, the frequency, the square-wave width (pulse width) or by a combination of the above.

One disadvantage of both types of supply is caused by the poor power factor of the ozone generator (cos $\Psi = 0.4\ldots 0.5$), which means that the supplies must be oversized. The effects of the poor power factor on the mains can, if necessary, be reduced by compensation on the mains side.

In a further device for the generation of ozone (German Offenlegungsschrift No. 2,122,041), in which two electrodes, which are connected to the poles of an alternating current source, are isolated from one another by a solid dielectric and a gas path, an inductance is inserted between the alternating current source and the electrodes. This inductor has a magnitude such, on the one hand, the natural frequency of the resonating circuit formed by the inductance in combination with the capacitance of the solid dielectric is below the operation frequency of the alternating current source, but, on the other hand, the inductance is so dimensioned that, together with the capacitance formed by the series connection of the dielectric and the gas path, it forms a resonating circuit with natural frequency above the operating frequency of the alternating current source.

In this fashion, use of a correspondingly large inductance means that the natural frequency of the system, when ignited, is lower than the operating frequency and that the harmonic content which is produced is considerably reduced. Thus, the capacitance of the ozone generator changes in total twice within one period of the applied alternating voltage, and the natural frequency of the system is first above and then below the operating frequency. If the inductance is designed correctly, a voltage is achieved at the ozone generator which is significantly above the voltage at the high-voltage source, maybe even more than twice that voltage, and an almost sinusoidal current curve is thereby produced. The harmonics in the current disappear almost completely, and a favorable load of the high-voltage source is obtained.

The compensation, provided in known devices, of the capacitive load of the voltage source is only effective in a comparatively small power density range. In addition, the proposed dimensioning of the inductance fails in ozone generators which are supplied by rectifiers.

SUMMARY OF THE INVENTION

Accordingly, the objects of this invention are to provide a novel device for the generation of ozone and to indicate a process for its operation which enables operation over a broad power density range, enables the power factor at relatively high frequencies to be improved and enables the use of economic inverters.

These and other objects are achieved by providing a new and improved device for the generation of ozone, including an ozone generator having two electrodes connected to the secondary terminals of a high-voltage transformer and isolated by means of a solid dielectric and a gas path. As part of the current supply of the ozone generator, a compensation choke for compensation of the capacitive load of the current supply is connected to the high-voltage transformer, which is fed, on the primary side, by a converter which supplies a square-wave current of variable amplitude and variable frequency. The inductance of the compensation choke and the operating frequency are dimensioned so that the resonance frequency of the resonating circuit formed by the ozone generator and the compensation choke lies below the operating frequency of the supply in any operating condition.

According to the process of the invention, the frequency of the output current of the converter is controlled in dependence on the current.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
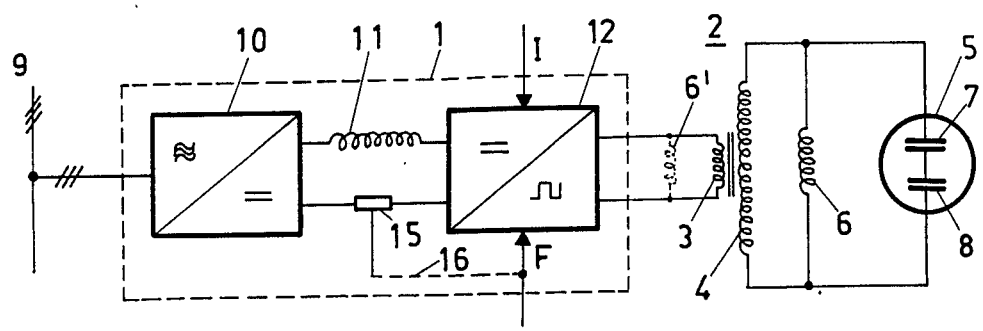
FIG. 1 is a schematic circuit diagram of a device, for the generation of ozone, which is supplied by an inverter.

Referring now to the drawings, wherein like reference numerals designate identical or corresponding parts throughout the several views, and more particularly to FIG. 1 thereof, therefor a device for the generation of ozone comprises essentially a converter 1, a high-voltage transformer 2 with primary winding 3 and secondary winding 4 and the actual ozone generator 5, which is symbolized by its simplified equivalent circuit. A compensation choke 6 is connected in parallel to the secondary terminals of the high-voltage transformer 2, and is thus also parallel to the ozone generator.

Figure 6A:
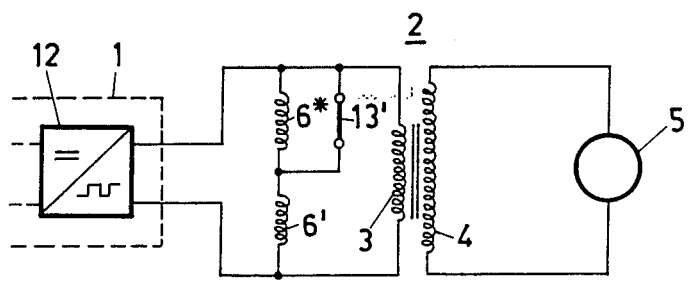
FIGS. 6a, 6b, and 6c are schematic circuit diagrams showing a series of various circuit arrangements for improvement or optimization of the start phase.
Figure 6B:
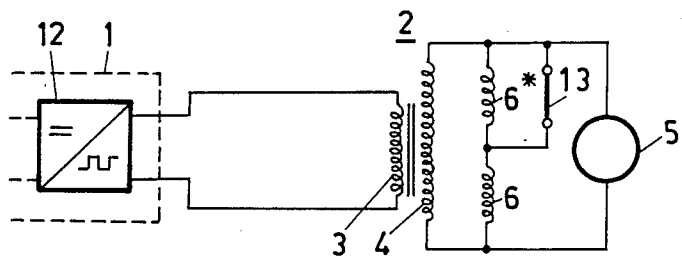

In the ozone generator 5, a first condenser 7 represents the capacitance of the dielectric, and a second condenser 8 represents the capacitance of the gas path between the dielectric and the counterelectrode. The actual construction of the ozone generator 5 corresponds to the state of the art, for example according to German Offenlegungsschrift No. 2,111,041 mentioned initially, and for this reason need not be described in further detail. The same goes for the high-voltage transformer 2. The converter 1, which also belongs to the state of the art, comprises essentially a line-commutated rectifier 10, which is fed by an industrial 3-phase network 9 and which is connected to a load-commutated inverter 12 via a smoothing choke 11. The frequency and amplitude, symbolized by the arrows F and I, of the square-wave output current of the converter, which acts as a current source, can be adjusted externally within wide limits. Further details of the line-commutated rectifier are, for example, given in the company publication "Veritron-Stromwandler Typenreihe ASD [Veritron current converters, series ASD]", publication No. DHS 261481D, undated, of the applicant. The load-commutated inverter is also a known device such as, for example, described in DE-B No. 2,525,580, FIG. 6 in combination with the relevant text in column 4.

During operation of the ozonizer, the high capacitive reactance must be compensated by addition of a correspondingly dimensioned inductive reactance. In FIG. 1, the compensation choke 6, which is connected in parallel to the secondary winding terminals of the high-voltage transformer 2, is provided for this purpose.

Figure 2:
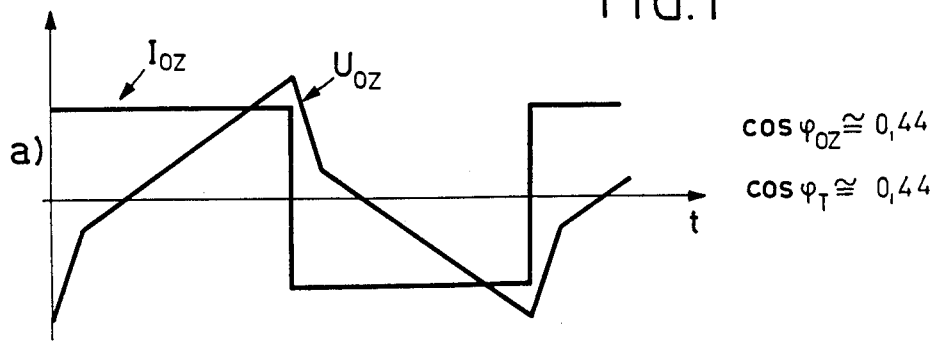
FIGS. 2a, 2b and 2c are graphs showing representations of the behavior with time of the voltage and current at the ozone generator with different compensations.
Figure 2:
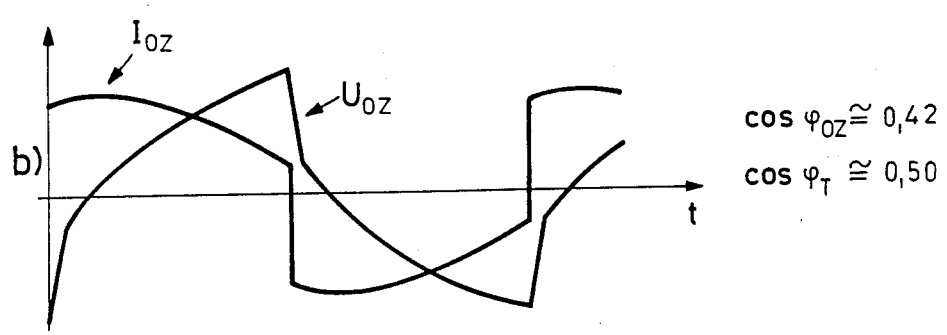
Figure 2:
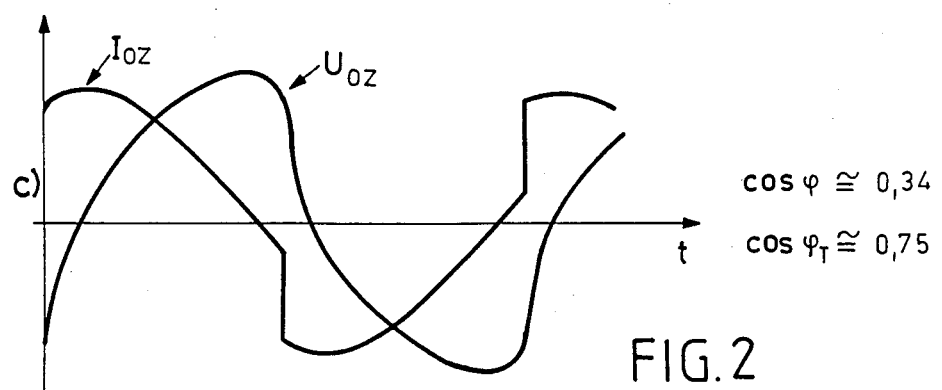

Large inductance of the choke 6 only produces a slight improvement of the power factor at the high-voltage transformer 2, whereas a small inductance greatly improves the power factor. The compensation is limited by the capacitive energy which is required by the inverter for commutation. The current and voltage form (lines $I_{OZ}$ or $U_{OZ}$) at the ozone generator also change with increasing compensation. This is illustrated in FIG. 2, in which FIG. 2a shows the current and voltage form for the uncompensated condition, such as according to German Auslegeschrift No. 2,525,059, whilst FIGS. (b) and (c) illustrates the relationships with low and high compensation respectively.

Both voltage and current approach the sinusoidal form (FIG. 2c) with increasing compensation, but the jump in current signal, which emanates from the feeding square-wave current from transformer 2, is maintained.

As long as this jump intersects with the O-line—this is the case without compensation or with only slight compensation—the supply can be started without further measures and the output power can be increased to the maximum. The power factor also decreases with decreasing power density q. If, in contrast, the jump in the current signal no longer intersects with the O-line (strong compensation), then the power factor increases with decreasing power density q. The dark discharge in the ozone generator disappears before the square-wave current at the transformer changes its sign. The supply can, in this case, only be started and operated with a small power density when the compensation is reduced.

Figure 3:
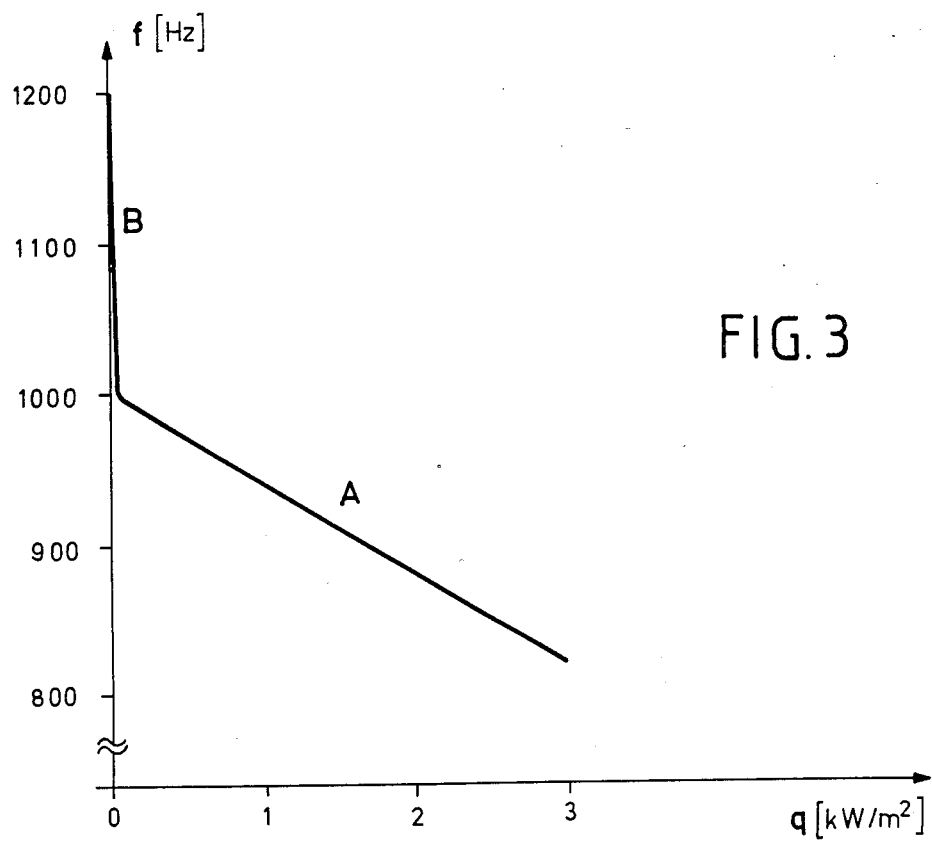
FIG. 3 is a graph showing a possible frequency control of the inverter with strong compensation.

Variations, according to the invention, of the compensation by variation of the frequency is shown by FIG. 3. It can be accomplished very simply, because a linear relationship exists between frequency and power density (kW/m² electrode surface) in the working range (section A of the curve in FIG. 3) of the ozone generator. This possibility is illustrated in FIG. 1: in the direct current intermediate circuit, the current flowing there which acts, via the effective connection 16, which is drawn as a dashed line, on the frequency control input F of the inverter 12 is determined with a current measuring device 15. The specific energy requirements $E_S$ (kilowatt hours per kilo of generated ozone) does not deteriorate in spite of the non-square-wave current at the ozone generator and the thereby non-linear increase in voltage.

Figure 5:
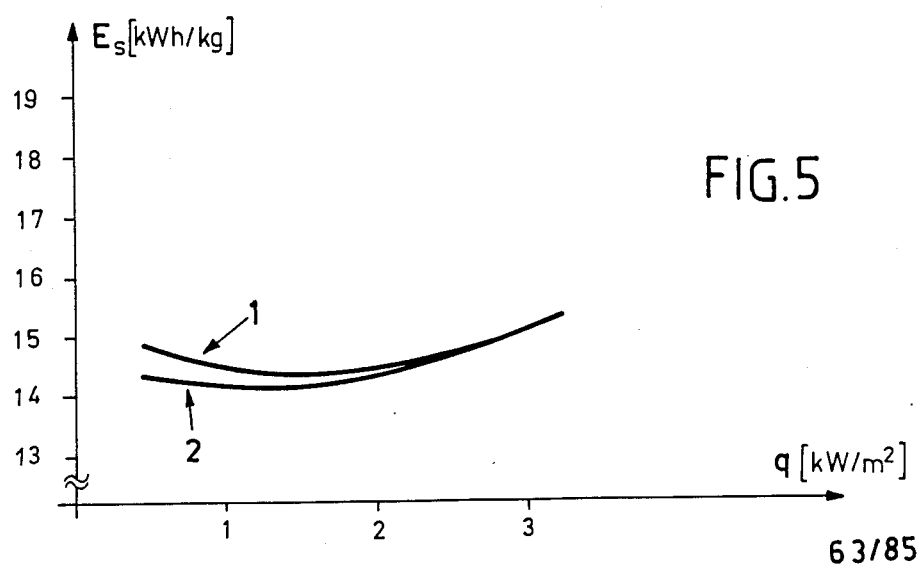
FIG. 5 is a graph showing a comparison of the specific energy requirements at different compensations.

FIG. 5 shows the effect of the invention on the specific energy requirement $E_S$, especially for small power densities q. Here, curve 1 represents the uncompensated case, and curve 2 the compensated case.

The dimensioning of the compensation choke is given by the following approximate formula $$L = \frac{U_{eff}^2}{2\pi \cdot f \cdot P_W \cdot k},$$

where $U_{eff}$ is the effective voltage at the ozone generator, $P_W$ is the performance at the ozone generator, f is the frequency of the feed current and k is an ozone-generator-specific, $P_W$-dependent value between 0.5 and 1.5. The power-dependent (i.e. on the magnitude of the capacitance C of the ozone generator) inductance values are between 1 and 50 mH for ozone generators with powers of about 500 kW, and between 10 and 500 mH for those with powers of about 50 kW.

The guide values above are valid for a compensation circuit according to FIG. 1, in other words with a compensation choke on the secondary side of the high-voltage transformer 2. As indicated in FIG. 1, the compensation can, however, be brought about by parallel connection of a compensation choke 6' (dashed line) to the converter output.

Both compensation arrangements have a number of advantages. With compensation on the primary side, a compensation choke with low inductance and low isolation can be used. However, the design power of the high-voltage transformer becomes larger and greater losses occur in it. For compensation on the secondary side, although the inductance of the choke becomes larger and the choke must be designed for high voltage, against this the design power of the high-voltage transformer does become smaller, and fewer losses occur.

The essential features and advantages of the invention can be summarized as follows:

The compensation does not have a disadvantageous effect on the degree of effectiveness, and, in fact, the compensation leads to an improvement in the degree of effectiveness for small power densities.

With increasing compensation, the voltage and current at the ozone generator become more and more sinusoidal (FIG. 3). The jump, caused by the original squarewave current—which is still present at the high-voltage transformer—is, however, maintained.

The effective voltage at the ozone generator increases and cos $\Psi$ at the ozone generator decreases with increasing compensation.

With strong compensation (cos $\Psi > 0.6$), the ozone generator ceases before the square-wave current changes its sign at the high-voltage transformer.

For weak compensation (as also without compensation), cos $\Psi$ decreases with decreasing power density q. In this case, it is always possible to start the converter. For strong compensation (cos $\Psi > 0.6$), cos $\Psi$ increases with decreasing power density. In this case, it is only possible to start the converter if the frequency is increased (FIG. 3).

An auxiliary device (start unit) is normally employed to start the inverter. This auxiliary device can be dispensed with in equipment without compensation if a certain fundamental current (1/10 of the rated direct current is a favorable value) is set in the direct current intermediate circuit, so that sufficient commutation energy is guaranteed for starting the inverter. In equipment with compensation, this method does not always lead to reliable starting since the resonating circuit, consisting of compensation choke and ozone generator, interferes with the starting process due to its natural resonance. This disadvantage can be eliminated by means of a suitable start frequency which is matched to the resonance frequency. It is also advantageous to increase the fundamental current gradually during starting from very small values (advantageously 1/100 to 1/30) to the desired operating current.

Further possible solutions for the starting of the inverter are:

Introduction of a further compensation choke 6* in series with the existing choke 6 or 6' (relatively weak compensation). This choke 6* is short-circuited by means of switch 13 or 13' (FIG. 6a or 6b) after the start.

Introduction of parallel capacitances during the start process (relatively weak compensation). Because of the relatively low voltage level, it is advantageous to arrange the condenser or condensers 14 and the relevant switch 15 on the primary side of the high-voltage transformer 2 (FIG. 6c).

Figure 4:
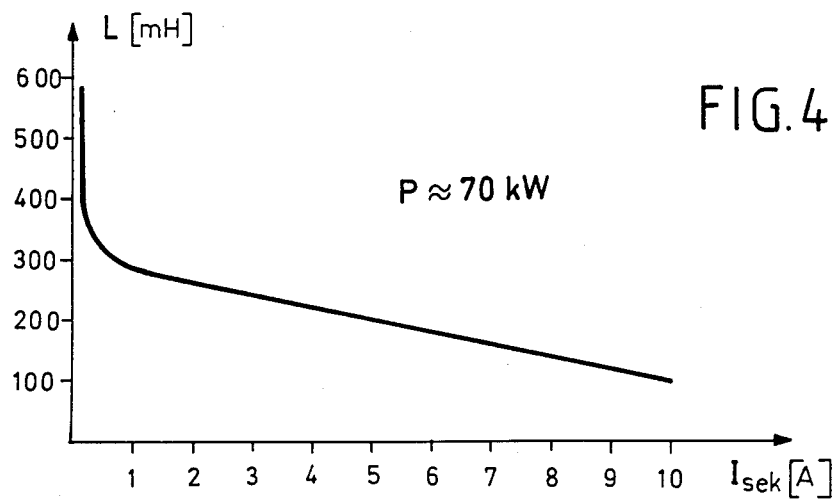
FIG. 4 is a graph showing the relationship between secondary current of the high-voltage transformer and inductance of the compensation choke.

Replacement of the compensation choke with fixed inductance by one with current-dependent inductance, according to FIG. 4 (Isthmus choke). The frequency control of the inverter could thereby also be dispensed with.

Figure 6C:
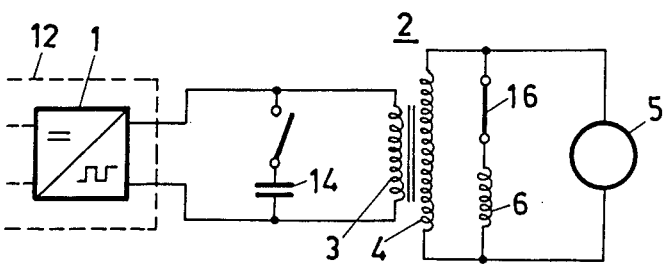

Introduction of the compensation choke (6, 6') by means of switch 1b after the inverter is already running (right-hand half of FIG. 6c).

Increasing the frequency of the inverter advantageously by about 50% (curve section B in FIG. 3).

With the thyristors obtainable today, a load-commutated inverter still commutes up to a cos $\Psi \simeq 0.85$. Compensation is also possible up to this cos $\Psi$. At smaller powers, this limit is higher and can achieve values up to cos $\Psi = 0.9$.

As the inductance of the compensation choke is inversely proportional to the size of the ozone generator ($\omega^2 = 1/LC$, where C is the capacitance of the ozone generator and increases proportionally to its size), compensation is only worthwhile from a certain minimum size of the ozone generator. For equipment with 60 kW (10 kg $O_3$/h from $O_2$, compensation at cos $\Psi = 0.57$), it became evident that the high-voltage transformer, the compensation choke and the direct current choke in the intermediate circuit of the converter are cheaper together than a high-voltage transformer and a direct current choke in the uncompensated case. In addition, there are further significant savings regarding the inverter, rectifier and the compensation on the mains side.

Although the mains side of the converter 1 is decoupled from the consumer side by the direct current intermediate circuit, the compensation choke 6 also leads to an improvement of the cos $\Psi_N$ on the mains side by about 20% since the rectifier is driven in a more favorable working range.

List of reference symbols

| | |
|---|---|
| 1 | Converter |
| 2 | High-voltage transformer |
| 3 | Primary winding |
| 4 | Secondary winding |
| 5 | Ozone generator |
| 6,6',6* | Compensation chokes |
| 7 | Dielectric capacitance |
| 8 | Air gap capacitance |
| 9 | Mains |
| 10 | Rectifier |
| 11 | Intermediate circuit choke |
| 12 | Inverter |
| 13,13',15,16 | Switches |
| 14 | Condenser |
| 15 | Current measuring device |
| 16 | Effective connection |

What is claimed as new and desired to be secured by letters patent of the United States is:

1. A device for the generation of ozone, comprising:
   a high voltage transformer having a primary winding and a secondary winding;
   a converter for supplying a square wave current of variable amplitude and of variable frequency to said primary winding;
   an ozone generator connected across the secondary winding of said high voltage transformer, including a pair of electrodes separated by a solid dielectric and a gas path; and
   variable compensation reactance means connected across a selected of the primary and secondary windings of said transformer for maintaining a resonant frequency of a resonant circuit including the compensation reactance means and the ozone generator at a desired frequency both when the ozone generator is in a start state and in an operating state, including a compensation choke and a switch connected to said choke for switching said choke into or out of said resonant circuit in dependence on the state of the ozone generator;
   wherein the compensation reactance means has an inductance and said converter has a frequency selected so that the resonant frequency of said resonant circuit formed by said compensating reactance means and said ozone generator lies below the operating frequency of said converter in all operating conditions of the converter.

2. Device as claimed in claim 1, wherein the compensation choke is connected in parallel to the secondary winding of the high-voltage transformer.

3. Device as claimed in claim 2, wherein the inductance of the compensation choke is selected so that it complies with the following approximate formula:

$$L = \frac{U_{eff}^2}{2\pi \cdot f \cdot P_W \cdot k},$$

where $U_{eff}$ denotes the voltage at the ozone generator, $P_W$ denotes the power at the ozone generator, f denotes the frequency of the supply current and k denotes an ozone generator-specific, essentially $P_W$-dependent value between 0.5 and 1.5.

4. Device as claimed in claims 2 or 3, wherein the inductance of the compensation choke is selected dependent on the size of the ozone generator and lies between the values 10 $\mu$H and 10 H.

5. Device as claimed in claim 1, wherein the compensation choke is connected in parallel to the primary winding of the high-voltage transformer.

6. Device as claimed in claim 5, wherein the inductance of the compensation choke is selected so that it complies with the following approximate formula:

$$L = \frac{U_{eff}^2}{2\pi f \cdot w^2 \cdot P_W \cdot k},$$

where w denotes the high-voltage side to low-voltage side winding ratio of the high-voltage transformer, $P_W$ denotes the power of the ozone generator, f denotes the frequency of the supply current from the converter and k denotes an ozone generator-specific essentially $P_W$-dependent value between 0.5 and 1.5.

7. Device as claimed in claim 1, wherein when said compensation choke is connected across said primary winding, said compensation choke has an inductance smaller by a factor of $w^2$ than when said compensation choke is connected across said secondary winding, where w is the turns ratio of said transformer.

8. Device as claimed in claim 1, comprising:
means for determination of the current in the converter; and
means for decreasing the frequency of the output current of said converter approximately proportionally to its output current.

9. Device as claimed in claim 1, wherein said compensation reactance means comprises:
a further choke capable of being switched into the circuit in series with the compensation choke by means of said switch.

10. Device as claimed in claim 1, comprising:
parallel condensers capable of being switched into the circuit between the converter output and the ozone generator.

11. Device as claimed in claim 1, comprising:
means for switching the compensation choke into the circuit.

12. A device for the generation of ozone, comprising:
a high voltage transformer having a primary winding and a secondary winding;
a converter for supplying a square wave current of variable amplitude and of variable frequency to said primary winding;
an ozone generator connected across the secondary winding of said high voltage transformer, including a pair of electrodes separated by a solid dielectric and a gas path; and
a compensation choke connected across a selected of the primary and second windings of said transformer;
wherein the compensation choke has an inductance and said converter has a frequency selected so that a resonant frequency of a resonant circuit formed by said compensating choke and said ozone generator lies below the operating frequency of said converter in all operating conditions of the converter;
wherein the compensation choke has a current-dependent inductance and comprises an Isthmus choke.

13. A process for the generation of ozone implemented using an ozone generator having two electrodes connected across a secondary winding of a high voltage transformer and a solid dielectric and a gas path between the two electrodes, wherein a converter supplies a square wave current of variable amplitude and variable frequency to a primary winding of the high voltage transformer, and a compensation choke is connected across at lease a selected one of the windings of the high voltage transformer, comprising:
selecting an inductance for said compensating choke and an operating frequency of said converter such that a resonance frequency of a resonating circuit formed by the ozone generator and the compensation choke lies below the operating frequency of the converter under all operating conditions of the converter; and
controlling the frequency of the output current of the converter in dependence on the output current.

14. Process as claimed in claim 13, wherein, in a start phase of the converter, the frequency of the converter is increased by approximately 50% as compared with a normal operating phase.

15. Process as claimed in claim 13, wherein, in a normal operating phase of the converter with a power factor cos $\Psi$>0.6, the frequency of the converter is reduced with increasing output current.

16. Process as claimed in claim 13, wherein that the converter is started wigh a fundamental current between 1/100 and 1/30 of the rated current.

17. Process as claimed in claim 13, comprising:
connecting a further choke in series to the compensation choke before starting the converter; and
short-circuiting said further choke in an operating phase.

18. Process as claimed in claim 13, comprising:
switching at least one parallel condenser into the circuit across the secondary winding of the high-voltage transformer before starting the converter; and
switching out said at least one condenser of the circuit again in an operating phase of the converter.

19. Process as claimed in claim 13, comprising:
switching the compensation choke out of the circuit in a start phase of the converter; and
switching the compensation choke into the circuit across the selected winding of the high voltage transformer only after an operating phase of the converter is reached.

* * * * *